(12) United States Patent
Ishikawa et al.

(10) Patent No.: US 7,569,962 B2
(45) Date of Patent: Aug. 4, 2009

(54) MULTI-PHASE BRUSHLESS MOTOR WITH REDUCED NUMBER OF STATOR POLES

(75) Inventors: Tomokazu Ishikawa, Nagoya (JP); Masayuki Nashiki, Komaki (JP)

(73) Assignee: Denso Corporation, Kariya (JP)

( * ) Notice: Subject to any disclaimer, the term of this patent is extended or adjusted under 35 U.S.C. 154(b) by 373 days.

(21) Appl. No.: 11/443,187

(22) Filed: May 31, 2006

(65) Prior Publication Data
US 2006/0273684 A1 Dec. 7, 2006

(30) Foreign Application Priority Data
Jun. 1, 2005 (JP) ............................. 2005-161561

(51) Int. Cl.
*H02K 19/00* (2006.01)
(52) U.S. Cl. .................. 310/162; 310/245; 310/261; 310/179
(58) Field of Classification Search ........... 310/162, 310/254, 261, 179, 184–185, 216, 156.47, 310/156.45
See application file for complete search history.

(56) References Cited

U.S. PATENT DOCUMENTS

| 5,610,464 | A | 3/1997 | Asano et al. | |
|---|---|---|---|---|
| 6,236,133 | B1 * | 5/2001 | Nishikawa et al. | 310/179 |
| 6,353,275 | B1 * | 3/2002 | Nishiyama et al. | 310/156.53 |
| 7,288,868 | B2 * | 10/2007 | Tamaki et al. | 310/254 |
| 2002/0047429 | A1 * | 4/2002 | Kadoya et al. | 310/156.39 |
| 2002/0171308 | A1 * | 11/2002 | Inayama et al. | 310/156.43 |
| 2005/0012419 | A1 | 1/2005 | Kometani et al. | |
| 2005/0029890 | A1 * | 2/2005 | Kadoya et al. | 310/180 |

FOREIGN PATENT DOCUMENTS

| DE | 100 49 883 A1 | 4/2002 |
|---|---|---|
| EP | 1 207 616 A1 | 5/2002 |
| JP | A-06-261513 | 9/1994 |
| JP | A-8-126273 | 5/1996 |
| JP | A-2003-88011 | 3/2003 |
| JP | A-2004-304928 | 10/2004 |
| WO | WO 02/37643 A2 | 5/2002 |

OTHER PUBLICATIONS

Z.Q. Zhu et al.; *Influence of Design Parameters on Cogging Torque in Permanent Magnet Machines*; IEEE Transactions on Energy Conversion, vol. 15; No. 4; Dec. 2000.
Translation of Office Action by German Patent and Trademark Office, Mar. 26, 2008.
Chinese Office Action Issued Oct. 10, 2008.

* cited by examiner

*Primary Examiner*—Thanh Lam
(74) *Attorney, Agent, or Firm*—Oliff & Berridge, PLC (57) ABSTRACT

An A-phase brushless motor, where A is an integer greater than or equal to 2, includes a stator and a rotor. The stator has q stator poles, where q is an integer greater than or equal to A. The stator poles form S stator pole sets each consisting of A stator poles each of which corresponds to one of A phases, where S is an integer equal to (q/A). The rotor has p rotor poles, where p is an integer greater than or equal to 2, and is so arranged that the rotor poles face the stator poles. Further, in the brushless motor, $p \geq q$, and the stator poles are arranged in a circumferential direction of the motor such that a difference in electrical angular position between any adjacent two of the A stator poles in each of the S stator pole sets is equal to $(360°/A)$.

21 Claims, 10 Drawing Sheets

FIG. 18 (PRIOR ART)
180° (STATOR POLE WIDTH)
180° (ROTOR POLE PITCH)

MULTI-PHASE BRUSHLESS MOTOR WITH REDUCED NUMBER OF STATOR POLES

CROSS-REFERENCE TO RELATED APPLICATION

This application is based on and claims priority from Japanese Patent Application No. 2005-161561, filed on Jun. 1, 2005, the content of which is hereby incorporated by reference into this application.

BACKGROUND OF THE INVENTION

1. Technical Field of the Invention

The present invention relates generally to brushless permanent magnet motors for automobiles, household electrical appliances, and industrial uses.

More particularly, the invention relates to a mufti-phase, brushless, and permanent magnet motor that has an improved structure in which the number of stator poles is less than that of rotor poles.

2. Description of the Related Art

For three-phase AC motors, there are many combinations between the number of rotor poles and the number of stator teeth. Among them, the combination of eight rotor poles and twelve stator teeth, which is generally referred to as 2-3 system, has been widely used. (For example, a reference can be made to Japanese Patent First Publication No. H06-261513.)

Figure 16:
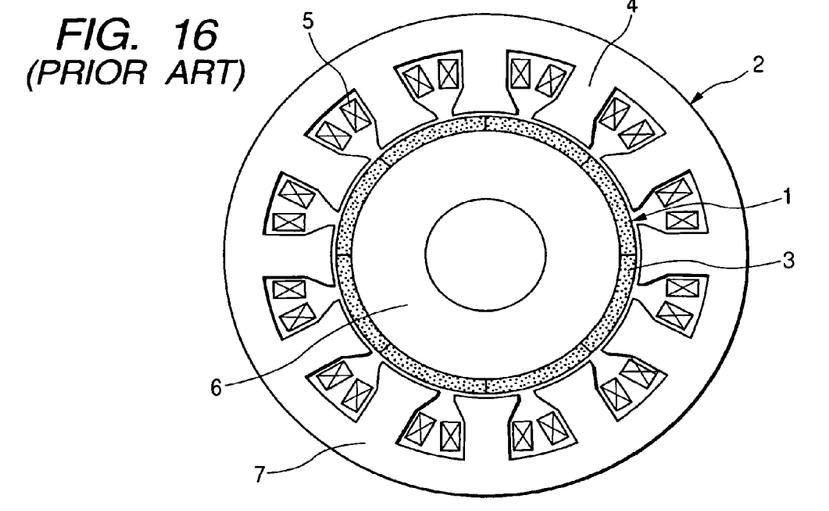
FIG. 16 is a cross-sectional view showing the overall structure of a conventional brushless motor.

FIG. 16 shows a conventional three-phase AC motor in which the 2-3 system is used.

As shown in FIG. 16, the motor includes a rotor 1 and a stator 2. The rotor 1 is configured with a rotor core 6 and eight permanent magnets 3 that are arranged on the surface of the rotor core 6. The stator 2 is configured with a stator core 7, which has twelve teeth 4, and stator windings 5 that are wound around the stator core 7 by a concentrated winding method.

Figure 19:
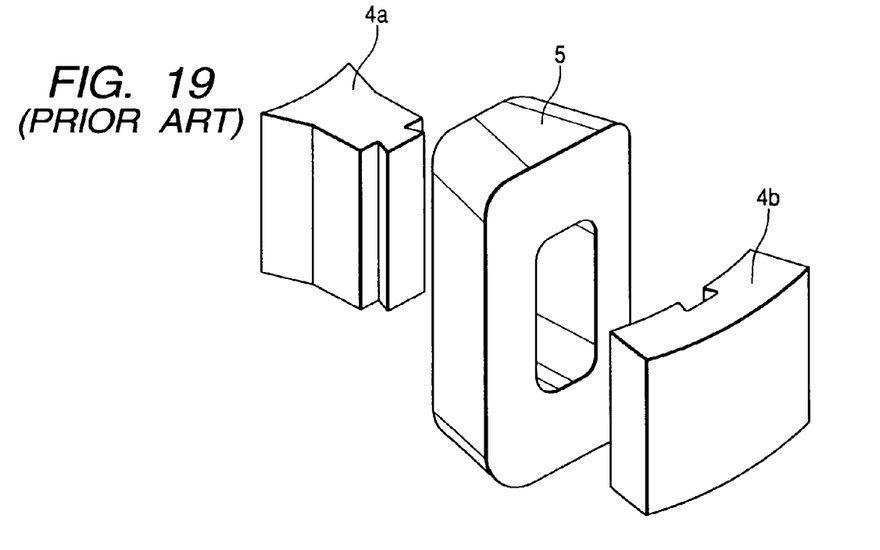
FIG. 19 is a schematic view illustrating a divided structure of stator core used in the conventional brushless motor of FIG. 16.

According to the concentrated winding method, the stator core 7 is in a divided form to improve the space factor of the stator windings 5. More specifically, as shown in FIG. 19, each tooth 4 is divided into two parts 4a and 4b, between which the stator windings 5 wound around a bobbin are inserted.

Figure 17:
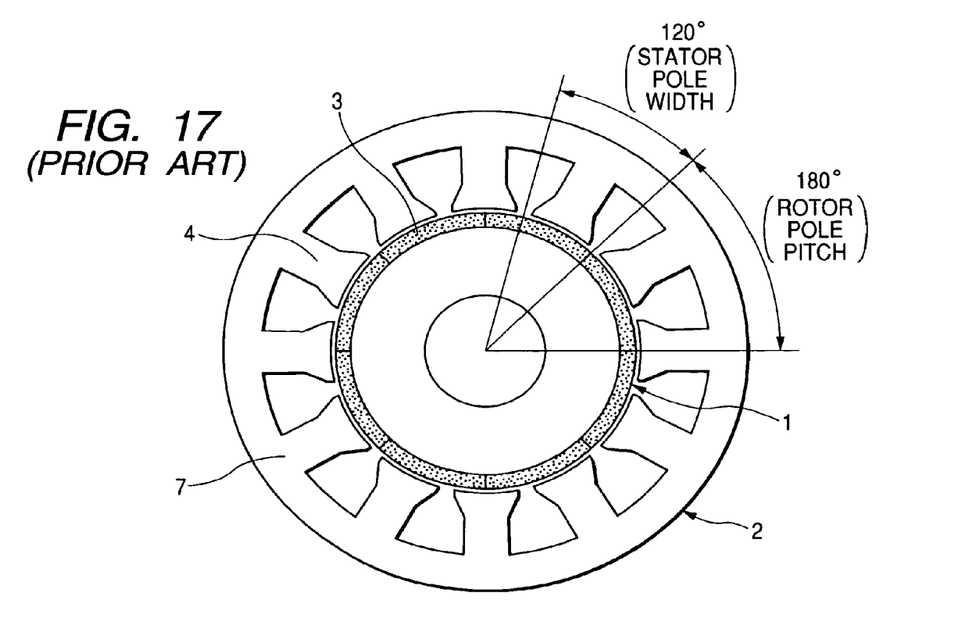
FIG. 17 is a schematic view illustrating the relation between the pitch of rotor poles and the angular width of stator poles in the conventional brushless motor of FIG. 16.

Further, as shown in FIG. 17, with respect to the rotor poles having a pitch corresponding to an electrical angular width of 180°, the stator poles have, at the inner end of the teeth 4, an angular width that corresponds to an electrical angular width a of 120°. Defining the winding factor k as $\cos((180°-\alpha)/2)$, then k is equal to 0.866 in this case. Indeed, since there are slot openings formed between the teeth 4, the electrical angular width $\alpha$ is in the range of 100 to 110°; Accordingly, the winding factor k will have a smaller value of 0.766 to 0.82.

Figure 18:
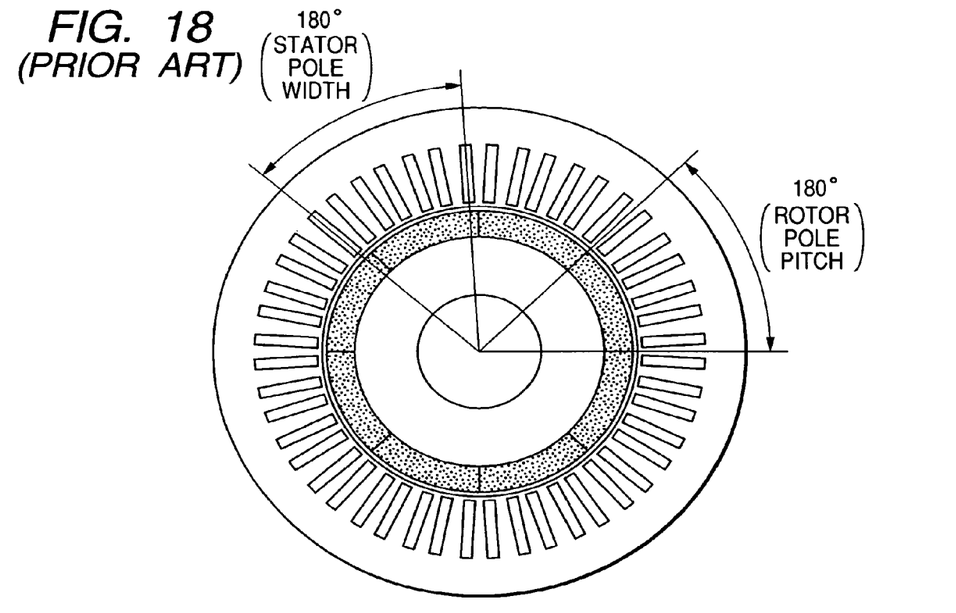
FIG. 18 is a schematic view illustrating a distributed winding method used for brushless motors.

In addition, if a distributed winding method is used instead of the concentrated winding method, the electrical angular width $\alpha$ corresponding to the angular width of the stator poles would become 180°, as shown in FIG. 18; the winding factor k would accordingly become equal to 1.

The above-described conventional motor has the following disadvantages.

Since the angular width of the stator poles is small, in terms of electrical angular width, with respect to the pitch of the rotor poles, the torque induced by electric current flowing through the stator windings 5 is small. Moreover, due to the small winding factor k, both the power output and efficiency of the motor are low.

Further, though the space factor of the stator windings 5 is improved by dividing the stator core 7, magneto-resistance increases at the connecting portions between the divided parts of the stator core 7, thus decreasing both the power output and efficiency of the motor.

In addition, the divided structure of the stator core 7 yields a magneto-resistance unbalance in the motor, which causes vibrations and noise of the motor to increase.

SUMMARY OF THE INVENTION

It is, therefore, an object of the present invention to overcome the above-mentioned disadvantages of the conventional motor.

It is a further object of the present invention to provide a multi-phase brushless motor with an improved structure that ensures high efficiency of the motor.

According to the present invention, an A-phase brushless motor, where A is an integer greater than or equal to 2, is provided which includes a stator and a rotor.

The stator has q stator poles, where q is an integer greater than or equal to A. The stator poles form S stator pole sets each consisting of A stator poles each of which corresponds to one of A phases, where S is an integer equal to (q/A).

The rotor has p rotor poles, where p is an integer greater than or equal to 2, and is so arranged that the rotor poles face the stator poles.

Further, in the brushless motor, $p \geq q$, and the stator poles are arranged in a circumferential direction of the motor such that a difference in electrical angular position between any adjacent two of the A stator poles in each of the S stator pole sets is equal to (360°/A).

As above, in the brushless motor according to the present invention, the number of stator poles is reduced, compared to the conventional motor shown in FIG. 16, and the space available for stator windings is accordingly increased.

Consequently, it becomes possible to use wires with a greater cross-sectional area and the same number of turns for the stator windings, thereby reducing both the copper and iron losses of the motor. Otherwise, it is also possible to use wires with the greater number of turns and the same cross-sectional area for the stator windings, thereby decreasing the electric current required to generate the same torque and thus the copper loss of the motor. As a result, high efficiency of the motor is secured.

Preferably, in the brushless motor, a difference in electrical angular position between any adjacent pair of the stator poles in different ones of the S sets is equal to one of $(360°\times(A-1)/A)$ and $(360°\times(A-1)/A-180°)$.

It is preferable that the brushless motor is configured to be used in combination with one or more other motors.

In the brushless motor, p may be equal to 4×N while q=3×N, where N is a positive integer.

In the brushless motor, p may also be equal to 6×N while q=3×N, where N is a positive integer.

In the brushless motor, p may also be equal to 8×N while q=3×N, where N is a positive integer.

In the brushless motor, p may also be equal to 10×N while q=6×N, where N is a positive integer.

In the brushless motor, p may also be equal to 4×N while q=2×N, where N is a positive integer.

In the brushless motor, p may also be equal to 6×N while q=4×N, where N is a positive integer.

In the brushless motor, p may also be equal to 6×N while q=2×N, where N is a positive integer.

Preferably, in the brushless motor, each of the stator poles has an angular width that corresponds to an electrical angular width in a range of 120 to 180°. Further, the stator poles form a first pole group and the rotor poles form a second pole group, and the poles of at least one of the first and second pole groups are skewed.

Preferably, in the brushless motor, the stator poles form a first pole group and the rotor poles form a second pole group, and each of the poles of at least one of the first and second pole groups is shaped such that an air gap between the each of the poles and any pole facing the each of the poles gradually increases from a circumferential center of the each of the poles to both circumferential ends of the same.

Preferably, in the brushless motor, the rotor includes a rotor base member made of a soft magnetic material and a plurality of permanent magnets, and a plurality of slits or nonmagnetic members are arranged in the rotor base member to regulate distribution of magnetic flux density in each of the rotor poles. Further, in each of the rotor poles, the slits or nonmagnetic members are spaced along the circumferential direction of the motor at electrical angular intervals D, and there are E of the rotor poles, among which there is such a relationship that a difference in electrical angular position between the slits or nonmagnetic members in each of the E rotor poles and those in one other of the E rotor poles is equal to D/E, where E is an integer greater than or equal to 2.

In the brushless motor, the rotor may be configured with a rotor base member and a plurality of permanent magnets that are arranged on the surface of the rotor base member.

In the brushless motor, the rotor may also be configured with a rotor base member and a plurality of permanent magnets that are embedded in the rotor base member.

Preferably, in the brushless motor, at least one of the stator poles is so arranged to have an angular position that is deviated by a shift angle from a reference angular position that corresponds to an electrical angular position being an integer multiple of 180°.

Preferably, in the brushless motor, at least one of the rotor poles is so arranged to have an angular position that is deviated by a shift angle from a reference angular position that corresponds to an electrical angular position being an integer multiple of 180°.

Preferably, in the brushless motor, the stator includes a stator core, which has q teeth, and stator windings wound around the stator core, and wherein the stator core is integrally formed with a stator lamination stack.

BRIEF DESCRIPTION OF THE DRAWINGS

The present invention will be understood more fully from the detailed description given hereinafter and from the accompanying drawings of the preferred embodiments of the invention, which, however, should not be taken to limit the invention to the specific embodiments but are for the purpose of explanation and understanding only.

In the accompanying drawings.

DESCRIPTION OF THE PREFERRED EMBODIMENTS

The preferred embodiments of the present invention will be described hereinafter with reference to FIGS. 1-15.

It should be noted that, for the sake of clarity and understanding, identical components having identical functions in different embodiments of the invention have been marked, where possible, with the same reference numerals in each of the figures.

Figure 1:
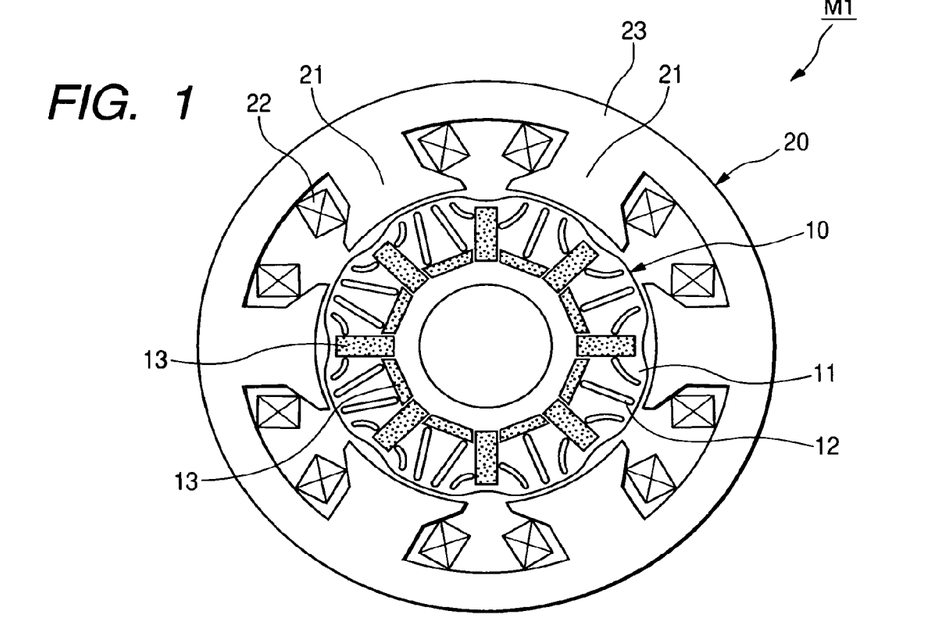
FIG. 1 is a cross-sectional view showing the overall structure of a brushless motor according an embodiment of the invention.

FIG. 1 shows the overall structure of a three-phase, brushless, and permanent magnet motor M1 according to an embodiment of the present invention.

As shown in FIG. 1, the motor M1 mainly includes a rotor 10 and a stator 20.

The rotor 10 defines eight rotor poles. More specifically, the rotor 10 includes a rotor core 11 and a plurality of permanent magnets 13. The rotor core 11 is made of a soft magnetic material. The permanent magnets 13 are embedded in the rotor core 11 and made, for example, of a rare-earth metal. The rotor core 11 is so shaped that the outer surface of the rotor core 11 is recessed radially inward at the boundary (or transition) portions between the rotor poles. For each of the rotor poles, the outer surface is formed with a circular arc that has a radius less than that of the rotor 10.

Further, in each of the rotor poles, there are arranged a plurality of slits 12 between the permanent magnets 13 to regulate the distribution of magnetic flux density in that rotor pole. More specifically, the magnetic flux created by the permanent magnets 13 is kept from extending in the circumferential direction of the motor M1 across the slits 12. Moreover, the slits 12 are so oriented to concentrate the magnetic flux on the circumferential center of the rotor pole. Consequently, the magnetic flux density is highest at the circumferential center and lowest at both the circumferential ends (i.e., the boundary portions) of the rotor pole, resulting in the magnetic flux distribution almost in the form of a sin wave.

Accordingly, with the above rotor structure having the embedded permanent magnets 13, it becomes possible to obtain the desired magnetic flux distribution, thereby increasing the output torque of the motor M1.

In addition, the magnetic flux passing through the boundary portions between the rotor poles generally has a small contribution to the generation of the motor torque. Adversely, a high magnetic flux density at the boundary portions likely causes a torque ripple. Accordingly, in the present embodiment, the boundary portions are recessed as described above to lower the magnetic flux density thereat.

It should be noted that, instead of the slits 12, nonmagnetic members may be embedded in the rotor core 11 to achieve the same effect.

The stator 20 defines six stator poles. More specifically, the stator 20 includes a stator core 23 and stator windings 22. The stator core 23 has six teeth 21 formed as salient poles of the stator 20 and six slots formed between the teeth 21. The stator windings 22 are wound around the teeth 21 of the stator core 23. Moreover, in the present embodiment, the stator core 23 has an integrated structure in which a plurality of thin stator laminations are stacked together to form the stator core 23.

Compared to the conventional motor shown in FIG. 16, the motor M1 according to the present embodiment has less stator poles with the same number of rotor poles. More specifically, in the conventional motor, the ratio of the number of rotor poles to that of the stator poles is (8:12); however, in the motor M1, the ratio is (8:6).

Further, in the motor M1, the stator poles of the stator 20 form two different stator pole sets. The first set includes three stator poles that respectively correspond to U, V, and W phases and have electrical angular positions 0°, 120°, and 240°. Thus, the difference in electrical angular position between any adjacent two of the stator poles in the first set is equal to (360°/3), i.e., 120°.

The second set also includes three stator poles that respectively correspond to U, V, and W phases.

When the stator windings 22 are wound around the stator poles in the second set in the same direction as those in the first set, the stator poles in the second set have electrical angular positions 0°, 120°, and 240°, respectively. Thus, the difference in electrical angular position between any adjacent two of the stator poles in the second set is also equal to (360°/3), i.e., 120°. Moreover, the difference in electrical angular position between any adjacent pair of the stator poles in different sets, such as the pair of the W-phase stator pole in the first set and the U-phase stator pole in the second set, is equal to (360°×(3−1)/3), i.e., 240°.

Otherwise, When the stator windings 22 are wound around the stator poles in the second set in a reverse direction to those in the first set, the stator poles in the second set have electrical angular positions 180°, 300°, and 420°, respectively. Thus, the difference in electrical angular position between any adjacent two of the stator poles in the second set is still equal to (360°/3), i.e., 120°. However, in this case, the difference in electrical angular position between any adjacent pair of the stator poles in different sets, such as the pair of the W-phase stator pole in the first set and the U-phase stator pole in the second set, is equal to (360°×(3−1)/3−180°), i.e., 60°.

The above-described motor M1 according to the present embodiment has the following advantages.

In the motor M1, the number q (q=6) of the stator poles is less than the number p (p=8) of the rotor poles (i.e., p>q). Therefore, there is a clear difference between the structure of the motor M1 and that of the conventional motor shown in FIG. 16 where p=2×4, q=3×4, and thus p<q.

Since the number of stator poles is reduced in the motor M1, the space available for the stator windings 22 is accordingly increased. Consequently, it becomes possible to use copper wires with a greater cross-sectional area and the same number of turns for the stator windings 22, thereby reducing both the copper and iron losses of the motor M1. Otherwise, it is also possible to use copper wires with the greater number of turns and the same cross-sectional area as the stator windings 22, thereby decreasing the electric current required to generate the same torque and thus the copper loss of the motor M1. As a result, high efficiency of the motor M1 is secured.

In addition, the relationship between the power output P and the torque T of the motor M1 is as follows.

$$P = V \times I = d\Phi/dt \times I = N \times T,$$

where, V is voltage, I is electric current, $\Phi$ is magnetic flux, t is time, and N is the number of revolutions.

In the motor M1, the stator core 23 is integrally formed with a stator lamination stack.

With the integrated structure of the stator core 23, it is possible to eliminate a magneto-resistance unbalance in the magnetic circuit which may, otherwise, be caused with the divided structure as shown in FIG. 19. Further, with the integrated structure, it is also possible to enhance the rigidity of the stator core 23. Consequently, with the balanced magneto-resistance and the enhanced rigidity of the stator core 23, it becomes possible to increase the efficiency of the motor M1 while decreasing both the vibrations and noise of the same.

In the motor M1, it is possible to secure wide openings of the slots formed between the stator poles in the stator core 23, due to the reduced number of stator poles and the integrated structure of the stator core 23.

Accordingly, it becomes possible to directly wind the stator windings 22 around the stator teeth 21. Instead, it is also possible to insert the stator windings 22 that have been previously wound into the slots in the stator core 23. Using either of the methods, the productivity of the motor M1 can be improved.

In the motor M1, each of the stator poles has an angular width that corresponds to an electrical angular width in the range of 120 to 180°. Accordingly, the winding factor k is in the range of 0.866 to 1.0.

With the large winding factor k, it becomes possible to increase both the power output and efficiency of the motor M1.

In the motor M1, each of the rotor poles is so shaped that the air gap between the rotor pole and any of the stator poles that faces the rotor pole gradually increases from the circumferential center of the rotor pole to both the circumferential ends of the same.

With such a shape of the rotor poles, it is possible to suppress a rapid change in magnetic flux in the circumferential direction of the motor M1, thereby reducing torque ripple and cogging torque.

In the motor M1, there are arranged slits 12 between the permanent magnets 13 to regulate the distribution of magnetic flux density in each of the rotor poles.

Consequently, it becomes possible to obtain a desired magnetic flux distribution by arranging the slits 12, thereby increasing the output torque of the motor M1.

Further, in each of the rotor poles, the slits 12 are spaced along the circumferential direction of the rotor 10 at electrical angular intervals D. Moreover, there are E of the rotor poles, among which there is such a relationship that a difference in electrical angular position between the slits 12 in each of the E rotor poles and the slits 12 in one other of the E rotor poles is equal to D/E, where E is an integer greater than or equal to 2.

More specifically, in FIG. 1, there are three slits 12 in each of the four right-side rotor poles and four slits 12 in each of the four left-side rotor poles. The difference in electrical angular position between any adjacent two of the slits 12 in the same rotor pole is equal to 45° (i.e., D=45°). Moreover, the difference in electrical angular position between the slits 12 in each of the four right-side rotor poles and the slits 12 in one of the four left-side rotor poles is equal to 22.5°. In other words, in this case, E is equal to 2 and there are four pairs of the rotor poles satisfying the above relationship.

With such an arrangement of the slits 12, it becomes possible to offset the torque ripple generated in one of the rotor poles by that generated in the other of the same pair.

While the above particular embodiment of the invention has been shown and described, it will be understood by those who practice the invention and those skilled in the art that various modifications, changes, and improvements may be made to the invention without departing from the spirit of the disclosed concept.

For example, the above-described motor M1 may be used for household electrical appliances, such as a refrigerator and an air conditioner, automobiles, and industrial uses.

Moreover, though the rotor 10 is obtained by embedding the permanent magnets 13 in the rotor core 11 in the previous embodiment, it may also be obtainable by other methods, such as arranging the permanent magnets 13 on the surface of the rotor core 11.

The motor M1 is, preferably, configured to be used in combination with one or more other motors to provide an increased torque and power output.

Though the motor M1 is configured as a three-phase motor (i.e., A=3) in the previous embodiment, it may also be configured to have any other numbers of phases greater than or equal to two (i.e. A≧2).

Figure 2:
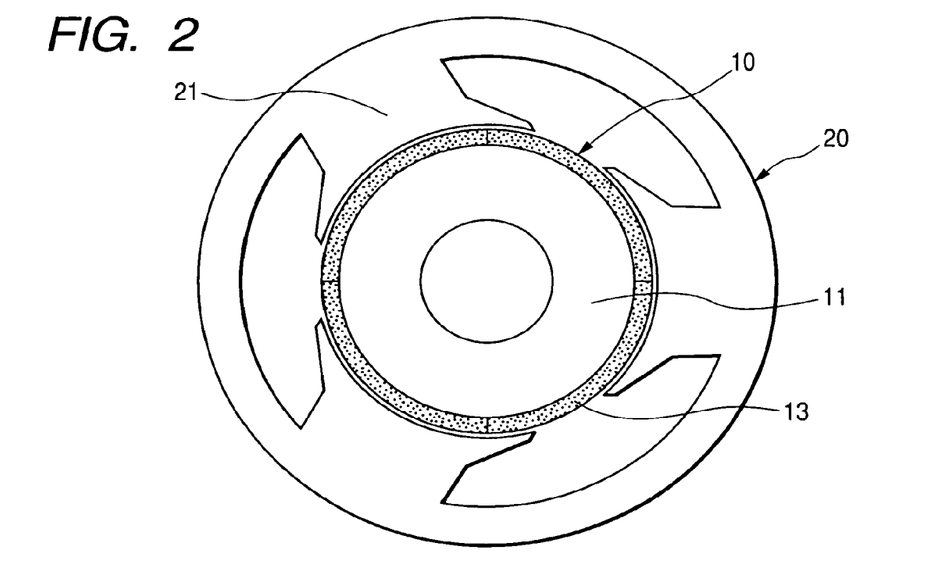
FIG. 2 is a cross-sectional view illustrating a first variation of the brushless motor of FIG. 1.

FIG. 2 shows a first variation of the motor M1, which is a 4p3s three-phase AC motor where the rotor 10 is formed by arranging the permanent magnets 13 on the surface of the rotor core 11 and defines four rotor poles, and the stator 20 has three teeth 21 to define three stator poles. Here, 4p3s represents the number of rotor poles being equal to four and that of stator poles being equal to three.

The first variation of the motor M1 falls into a first group of brushless motors according to the present invention in which the number of rotor poles is equal to 4×N while the number of stator poles is equal to 3×N, where N is a positive integer. Other motors of the first group that can be in practical use are, for example, 8p6s and 12p9s motors.

Figure 3:
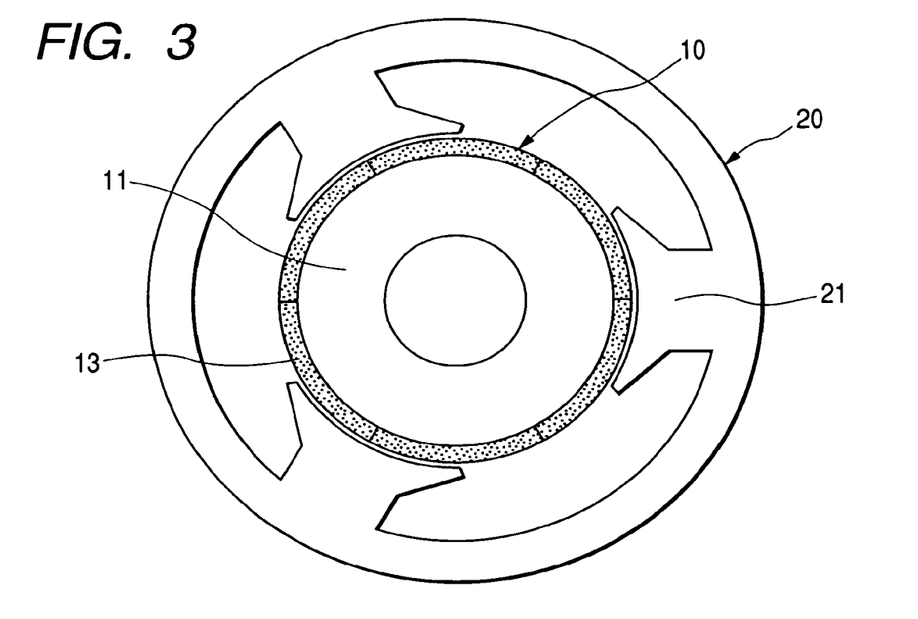
FIG. 3 is a cross-sectional view illustrating a second variation of the brushless motor of FIG. 1.

FIG. 3 shows a second variation of the motor M1, which is a 6p3s three-phase AC motor where the rotor 10 is formed by arranging the permanent magnets 13 on the surface of the rotor core 11 and defines six rotor poles, and the stator 20 has three teeth 21 to define three stator poles.

The second variation of the motor M1 falls into a second group of brushless motors according to the present invention in which the number of rotor poles is equal to 6×N while the number of stator poles is equal to 3×N, where N is a positive integer. Other motors of the second group that can be in practical use are, for example, 12p6s and 18p9s motors.

Figure 4:
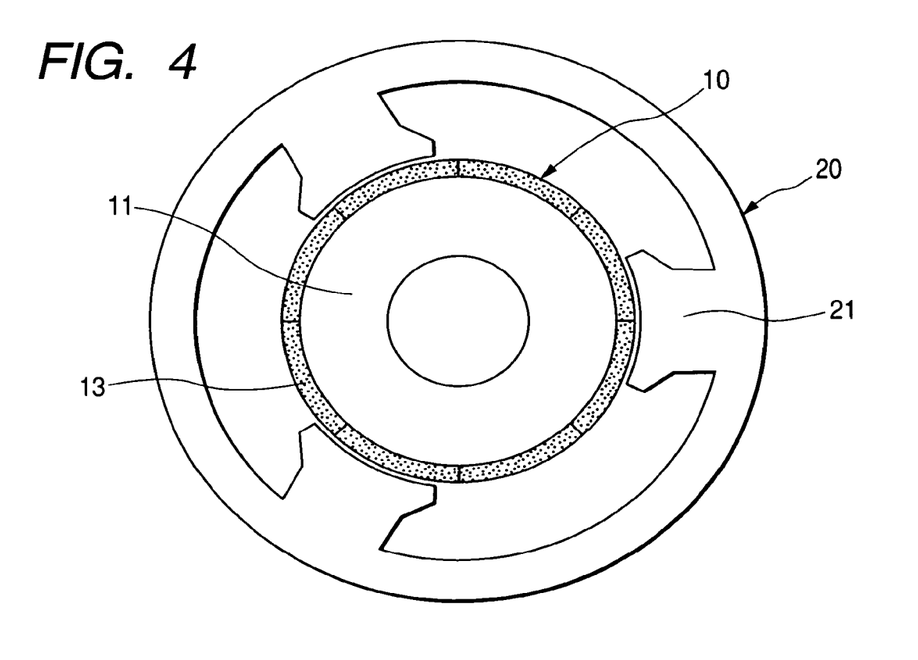
FIG. 4 is a cross-sectional view illustrating a third variation of the brushless motor of FIG. 1.

FIG. 4 shows a third variation of the motor M1, which is an 8p3s three-phase AC motor where the rotor 10 is formed by arranging the permanent magnets 13 on the surface of the rotor core 11 and defines eight rotor poles, and the stator 20 has three teeth 21 to define three stator poles.

The third variation of the motor M1 falls into a third group of brushless motors according to the present invention in which the number of rotor poles is equal to 8×N while the number of stator poles is equal to 3×N, where N is a positive integer. Other motors of the third group that can be in practical use are, for example, 16p6s and 24p9s motors.

Figure 5:
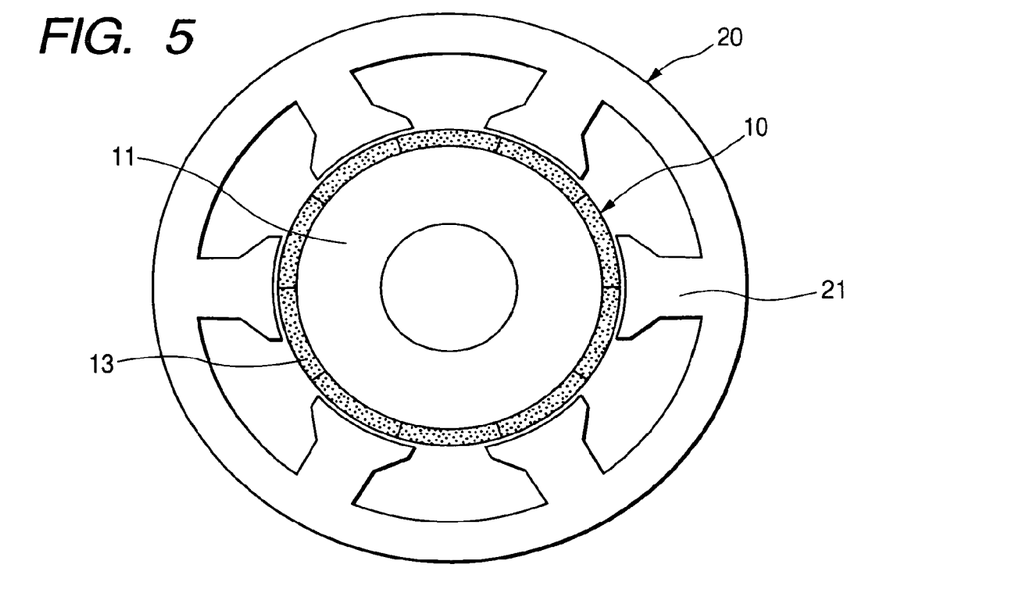
FIG. 5 is a cross-sectional view illustrating a fourth variation of the brushless motor of FIG. 1.

FIG. 5 shows a fourth variation of the motor M1, which is a 10p6s three-phase AC motor where the rotor 10 is formed by arranging the permanent magnets 13 on the surface of the rotor core 11 and defines ten rotor poles, and the stator 20 has six teeth 21 to define six stator poles.

The fourth variation of the motor M1 falls into a fourth group of brushless motors according to the present invention in which the number of rotor poles is equal to 10×N while the number of stator poles is equal to 6×N, where N is a positive integer. Other motors of the fourth group that can be in practical use are, for example, 20p12s and 30p24s motors.

Figure 6:
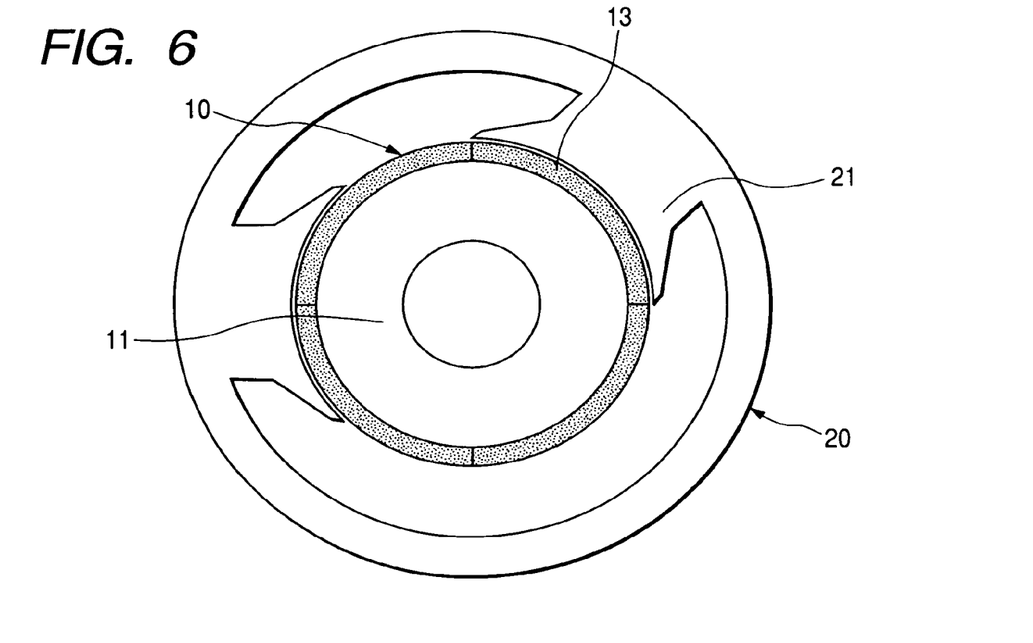
FIG. 6 is a cross-sectional view illustrating a fifth variation of the brushless motor of FIG. 1.

FIG. 6 shows a fifth variation of the motor M1, which is a 4p2s two-phase AC motor where the rotor 10 is formed by arranging the permanent magnets 13 on the surface of the rotor core 11 and defines four rotor poles, and the stator 20 has two teeth 21 to define two stator poles.

The fifth variation of the motor M1 falls into a fifth group of brushless motors according to the present invention in which the number of rotor poles is equal to 4×N while the number of stator poles is equal to 2×N, where N is a positive integer. Other motors of the fifth group that can be in practical use are, for example, 8p4s and 12p6s motors.

Figure 7:
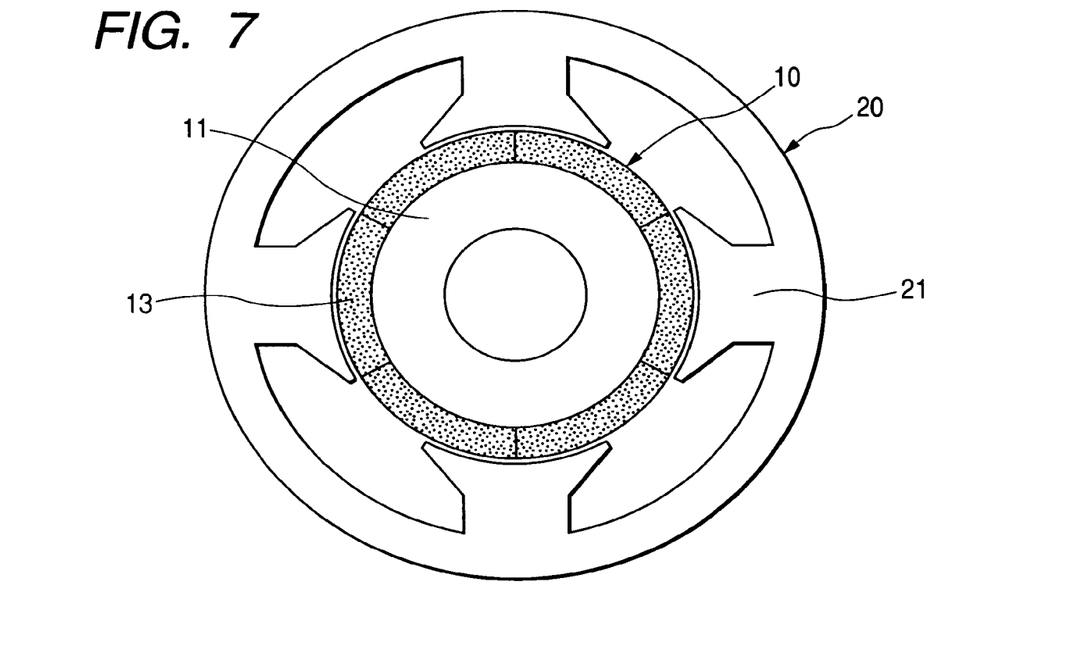
FIG. 7 is a cross-sectional view illustrating a sixth variation of the brushless motor of FIG. 1.

FIG. 7 shows a sixth variation of the motor M1, which is a 6p4s two-phase AC motor where the rotor 10 is formed by arranging the permanent magnets 13 on the surface of the rotor core 11 and defines six rotor poles, and the stator 20 has four teeth 21 to define four stator poles.

The sixth variation of the motor M1 falls into a sixth group of brushless motors according to the present invention in which the number of rotor poles is equal to 6×N while the number of stator poles is equal to 4×N, where N is a positive integer. Other motors of the sixth group that can be in practical use are, for example, 12p8s and 18p12s motors.

Figure 8:
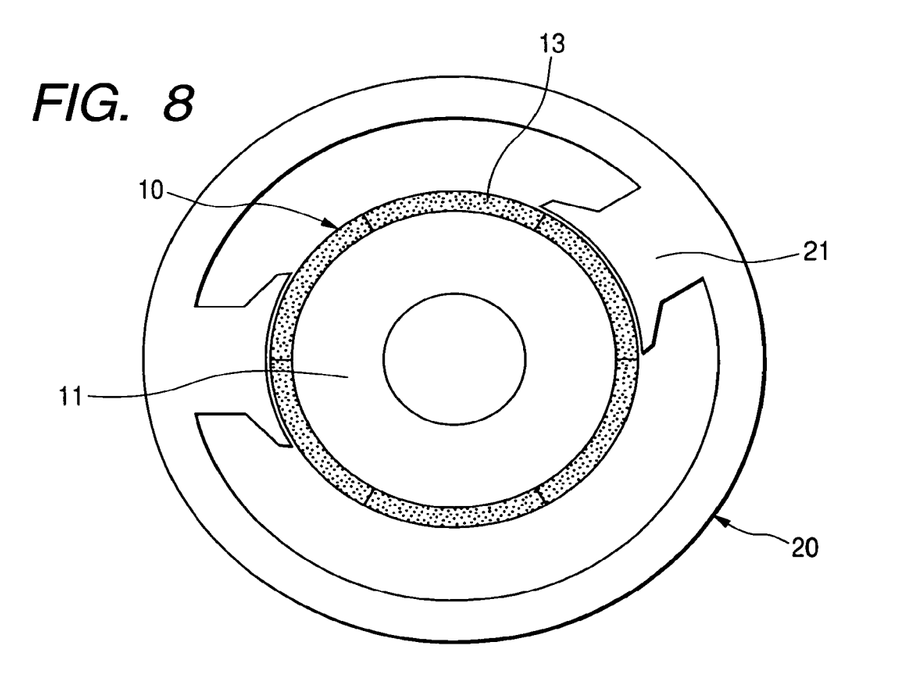
FIG. 8 is a cross-sectional view illustrating a seventh variation of the brushless motor of FIG. 1.

FIG. 8 shows a seventh variation of the motor M1, which is a 6p2s two-phase AC motor where the rotor 10 is formed by arranging the permanent magnets 13 on the surface of the rotor core 11 and defines six rotor poles, and the stator 20 has two teeth 21 to define two stator poles.

The seventh variation of the motor M1 falls into a seventh group of brushless motors according to the present invention in which the number of rotor poles is equal to 6×N while the number of stator poles is equal to 2×N, where N is a positive integer. Other motors of the seventh group that can be in practical use are, for example, 12p4s and 18p6s motors.

The brushless motors illustrated in FIGS. 1-8 have respective characteristics. For example, the number p of rotor poles relates to the allowable number of revolutions of the motor. Moreover, since the product of the number p of rotor poles and the number of revolutions is in proportional to the drive frequency of the motor, both the number p of the rotor poles and the number of revolutions have a strong correlation with the iron loss of the motor and relate to the allowable drive frequency of the motor. Accordingly, it is necessary to set a smaller number p for a higher speed brushless motor.

Further, as the number q of stator poles decreases, the torque tends to increase; however, at the same time, the number of portions generating the torque decreases, thus resulting in increased vibrations and noise of the motor.

Furthermore, the number A of phases is also an important factor. For example, the two-phase brushless motors have a simple structure; however, the configuration of inverters driving them is somewhat complex. The three-phase brushless motors are most widely used and the configuration of inverters driving them is simple. With the number A of phases not less than 4, it is possible to achieve a high quality operation of the brushless motors; however, the configuration of the inverters driving them is complex.

Accordingly, it is preferable to select a brushless motor according to the present invention for a specific use in consideration of the above characteristics of the brushless motors.

Figure 9:
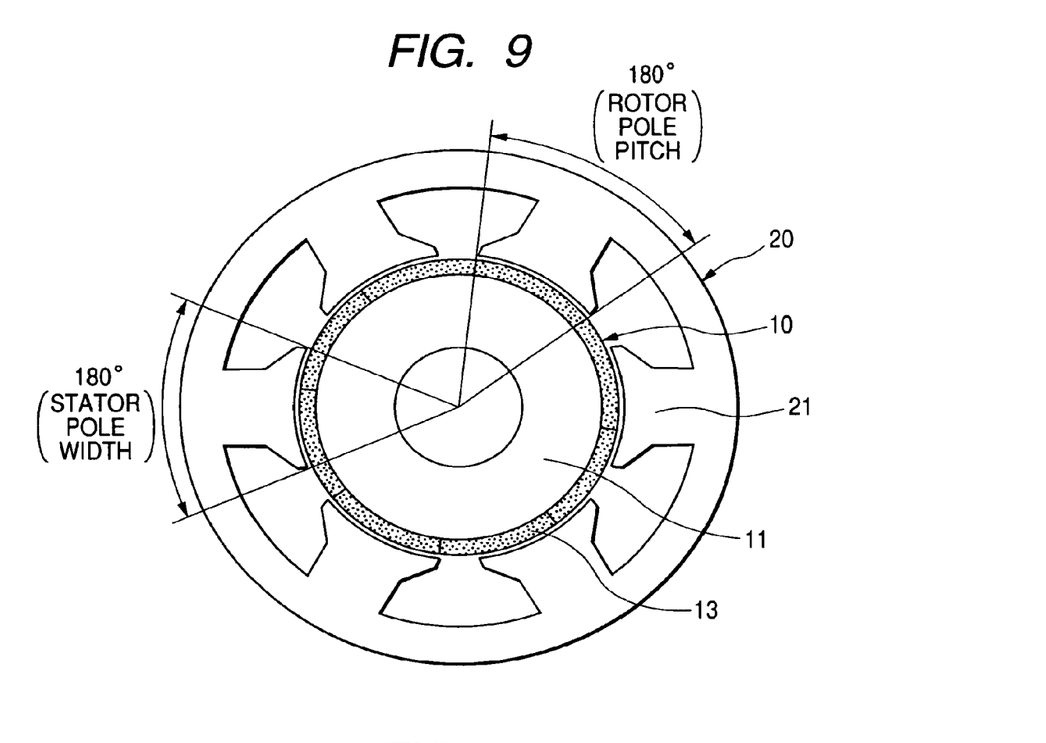
FIG. 9 is a cross-sectional view illustrating an eighth variation of the brushless motor of FIG. 1.

FIG. 9 shows an eighth variation of the motor M1, which is an 8p6s three-phase AC motor where the rotor 10 is formed by arranging the permanent magnets 13 on the surface of the rotor core 11 and defines eight rotor poles, the stator 20 has six teeth 21 to define six stator poles, and each of the stator poles has an angular width that corresponds to an electrical angular width of 180°. In other words, each of the stator poles has an angular width equal to the pitch of the rotor poles.

Figure 10:
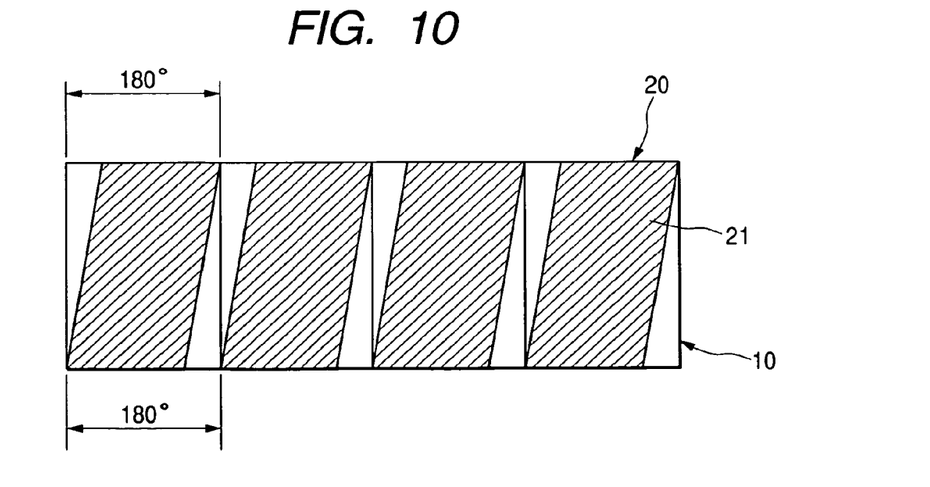
FIG. 10 is a cross-sectional view illustrating a ninth variation of the brushless motor of FIG. 1.

FIG. 10 exhibits a ninth variation of the motor M1 along the circumferential direction thereof, in which the stator 20 is so skewed that each of the stator poles has an angular width corresponding to an electrical angular width of 180°.

Through skewing the stator 20 as above, the winding factor k can be improved. In addition, it is also possible to skew the rotor 10, along with or instead of the stator 20, to achieve the same effect.

Figure 11:
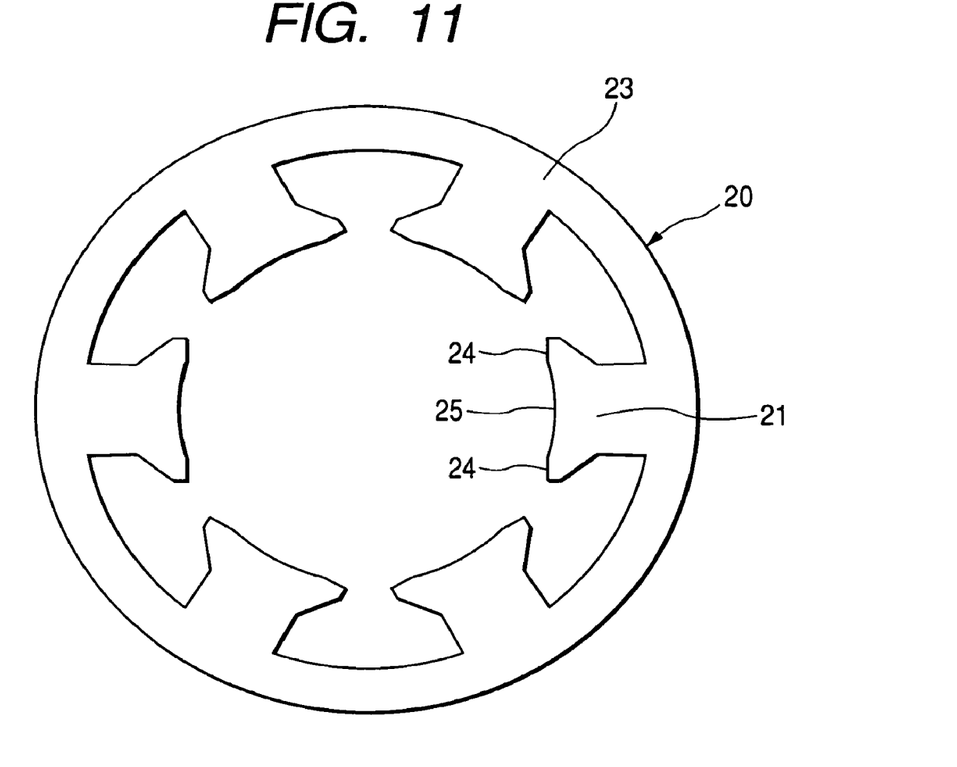
FIG. 11 is a cross-sectional view illustrating a tenth variation of the brushless motor of FIG. 1.

FIG. 11 shows a tenth variation of the motor M1, in which the teeth 21 of the stator core 23 have a modified shape. More specifically, the inner surface of each of the teeth 21 has the shape of a circular arc at a circumferential center portion 25 and gradually extends radially outward at both circumferential end potions 24 from the circular arc. Consequently, the inner diameter of the stator core 23 gradually increases at the circumferential end portions 24, and thus the air gap between the stator 20 and the rotor 10 also gradually increases at the circumferential end portions 24.

With the modified shape of the stator teeth 21, it is possible to suppress a rapid change in magnetic flux in the circumferential direction of the motor, thereby reducing torque ripple and cogging torque.

Figure 12:
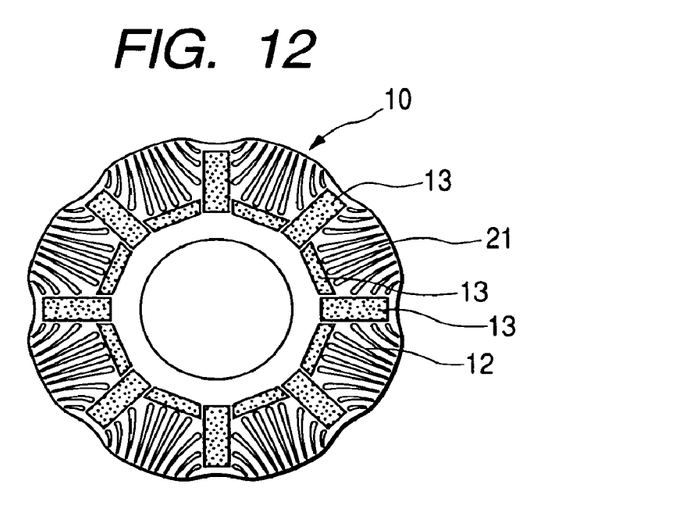
FIG. 12 is a cross-sectional view illustrating a eleventh variation of the brushless motor of FIG. 1.

FIG. 12 shows an eleventh variation of the motor M1, in which an increased number of slits 12 is used in each of the stator poles to obtain a more sine-wave-like distribution of magnetic flux density.

Consequently, with the improved distribution of magnetic flux density, torque ripple can be reduced and the output torque of the motor can be increased. In addition, as described previously, nonmagnetic members may be arranged in each of the stator poles instead of the slits 12 to achieve the same effect.

Figure 13:
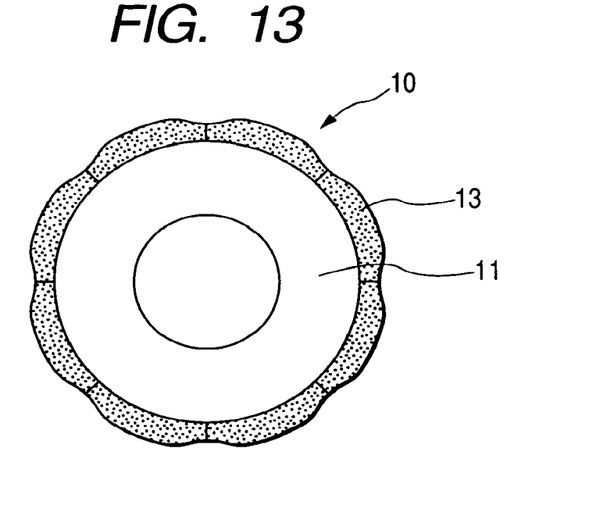
FIG. 13 is a cross-sectional view illustrating a twelfth variation of the brushless motor of FIG. 1.

FIG. 13 shows a twelfth variation of the motor M1, in which the rotor 10 is formed by arranging a plurality of permanent magnets 13 on the surface of the rotor core 11 and each of the permanent magnets 13 has the same shape of outer surface as in the motor M1.

Figure 14:
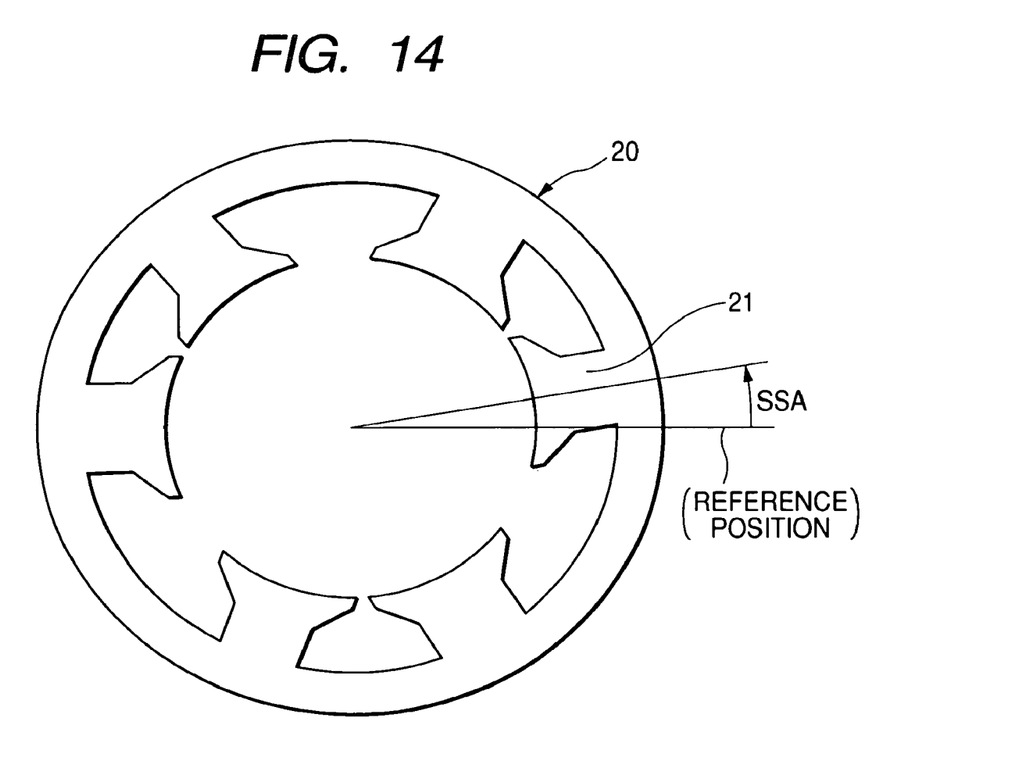
FIG. 14 is a cross-sectional view illustrating a thirteenth variation of the brushless motor of FIG. 1.

FIG. 14 shows a thirteenth variation of the motor M1, in which at least one of the stator poles is so arranged to have an angular position that is deviated by a shift angle SSA from a reference angular position that corresponds to an electrical angular position being an integer multiple of 180°.

With the above arrangement of the stator poles, it is possible to reduce the torque ripple that has a frequency being integer multiple of the shift angle SSA.

Figure 15:
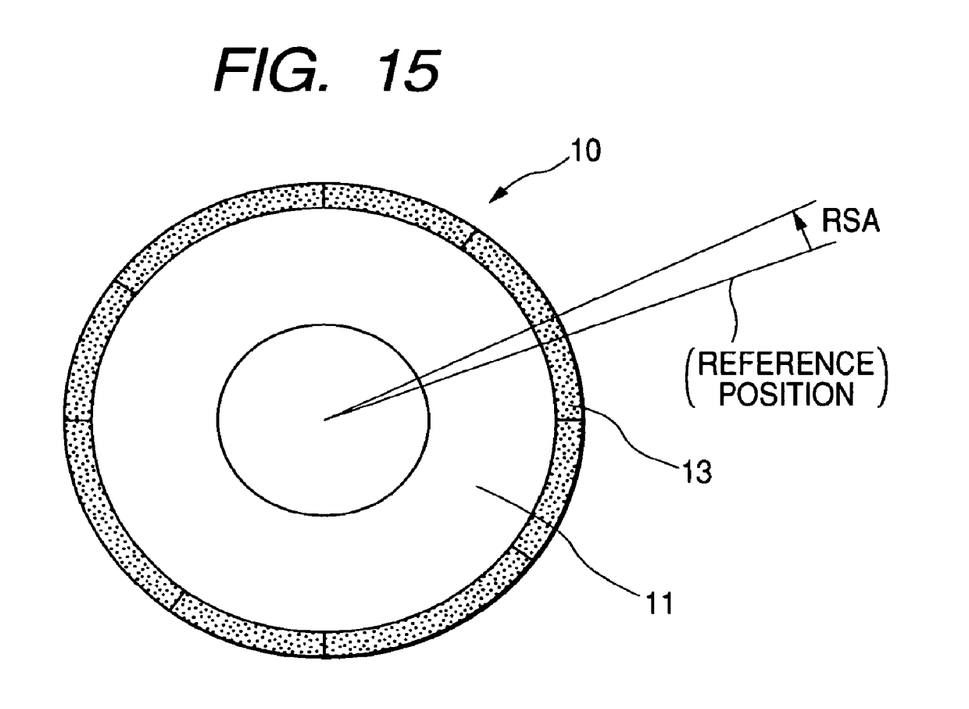
FIG. 15 is a cross-sectional view illustrating a fourteenth variation of the brushless motor of FIG. 1.

FIG. 15 shows a fourteenth variation of the motor M1, in which the rotor 10 is formed by arranging a plurality of permanent magnets 13 on the surface of the rotor core 11, and at least one of the rotor poles is so arranged to have an angular position that is deviated by a shift angle RSA from a reference angular position that corresponds to an electrical angular position being an integer multiple of 180°.

With the above arrangement of rotor poles, it is possible to reduce the torque ripple that has a frequency being integer multiple of the shift angle RSA.

In addition to the above-described variations, other modifications, changes, and improvements within the skill of the art are also possible within the scope of the appended claims.

What is claimed is:

1. An A-phase brushless motor, where A is an integer greater than or equal to 2, comprising:
   a stator having q stator poles, where q is an integer greater than or equal to A, the stator poles forming S stator pole sets each consisting of A stator poles each of which corresponds to one of A phases, where S is an integer equal to (q/A); and
   a rotor having p rotor poles, where p is an integer greater than or equal to 2, and being so arranged that the rotor poles face the stator poles,
   wherein, p≧q,
   the stator poles are arranged in a circumferential direction of the motor such that a difference in electrical angular position between any adjacent two of the A stator poles in each of the S stator pole sets is equal to (360°/A), and
   each of the stator poles has an angular width that corresponds to an electrical angular width of 180°.

2. The brushless motor as set forth in claim 1, wherein a difference in electrical angular position between any adjacent pair of the stator poles in different ones of the S sets is equal to (360°×(A−1)/A).

3. The brushless motor as set forth in claim 1, wherein a difference in electrical angular position between any adjacent pair of the stator poles in different ones of the S sets is equal to (360°×(A−1) / A−180°).

4. The brushless motor as set forth in claim 1, wherein the brushless motor is configured to be used in combination with one or more other motors.

5. The brushless motor as set forth in claim 1, wherein p=4×N, and q=3×N, where N is a positive integer.

6. The brushless motor as set forth in claim 1, wherein p=6×N, and q=3×N, where N is a positive integer.

7. The brushless motor as set forth in claim 1, wherein p=8×N, and q=3×N, where N is a positive integer.

8. The brushless motor as set forth in claim 1, wherein p=10×N, and q=6×N, where N is a positive integer.

9. The brushless motor as set forth in claim 1, wherein p=4×N, and q=2×N, where N is a positive integer.

10. The brushless motor as set forth in claim 1, wherein p=6×N, and q=4×N, where N is a positive integer.

11. The brushless motor as set forth in claim 1, wherein p=6×N, and q=2×N, where N is a positive integer.

12. The brushless motor as set forth in claim 1, wherein the stator poles form a first pole group and the rotor poles form a second pole group, and wherein the poles of at least one of the first and second pole groups are skewed.

13. The brushless motor as set forth in claim 1, wherein the stator poles form a first pole group and the rotor poles form a second pole group, and wherein each of the poles of at least one of the first and second pole groups is shaped such that an air gap between the each of the poles and any pole facing the each of the poles gradually increases from a circumferential center of the each of the poles to both circumferential ends of the same.

14. The brushless motor as set forth in claim 1, wherein the rotor includes a rotor base member made of a soft magnetic material and a plurality of permanent magnets, and wherein a plurality of slits or nonmagnetic members are arranged in the rotor base member to regulate distribution of magnetic flux density in each of the rotor poles.

15. The brushless motor as set forth in claim 14, wherein in each of the rotor poles, the slits or nonmagnetic members are spaced along the circumferential direction of the motor at electrical angular intervals D, and wherein there are E of the rotor poles, among which there is such a relationship that a difference in electrical angular position between the slits or nonmagnetic members in each of the B rotor poles and those in one other of the E rotor poles is equal to D/E, where E is an integer greater than or equal to 2.

16. The brushless motor as set forth in claim 1, wherein the rotor is configured with a rotor base member and a plurality of permanent magnets arranged on a surface of the rotor base member.

17. The brushless motor as set forth in claim 1, wherein the rotor is configured with a rotor base member and a plurality of permanent magnets embedded in the rotor base member.

18. The brushless motor as set forth in claim 1, wherein at least one of the stator poles is so arranged to have an angular position that is deviated by a shift angle from a reference angular position that corresponds to an electrical angular position being an integer multiple of 180°.

19. The brushless motor as set forth in claim 1, wherein at least one of the rotor poles is so arranged to have an angular position that is deviated by a shift angle from a reference angular position that corresponds to an electrical angular position being an integer multiple of 180°.

20. The brushless motor as set forth in claim 1, wherein the stator includes a stator core, which has q teeth, and stator windings wound around the stator core, and wherein the stator core is integrally formed with a stator lamination stack.

21. The brushless motor as set forth in claim 5, wherein N is equal to 2, so that p and q are respectively equal to 8 and 6.

* * * * *